May 27, 1958 J. R. STOKES ET AL 2,836,070
DAMPING MECHANISM
Filed May 9, 1956 3 Sheets-Sheet 1

INVENTORS
JEFFREY R. STOKES &
FRED M. SPRINGER
BY
*Frank N. Darman*
ATTORNEY

May 27, 1958  J. R. STOKES ET AL  2,836,070

DAMPING MECHANISM

Filed May 9, 1956  3 Sheets-Sheet 2

INVENTORS
JEFFREY R. STOKES &
FRED M. SPRINGER
BY

ATTORNEY

May 27, 1958  J. R. STOKES ET AL  2,836,070
DAMPING MECHANISM
Filed May 9, 1956  3 Sheets-Sheet 3

*INVENTOR.*
JEFFREY R. STOKES &
FRED M. SPRINGER
BY

ATTORNEY

United States Patent Office 2,836,070
Patented May 27, 1958

2,836,070

DAMPING MECHANISM

Jeffrey R. Stokes, Delmar, and Fred M. Springer, Solana Beach, Calif., assignors to Bill Jack Scientific Instrument Co., Solana Beach, Calif., a corporation of California Application May 9, 1956, Serial No. 583,692

3 Claims. (Cl. 74—5.5)

This invention relates to improvements in damping devices of the type employing a cylinder, a piston slidably mounted therein and a piston rod connected thereto and to the object whose movement it is desired to be damped.

More specifically, the invention relates to improvements in this type of damping device that employs a substantially spherical, or arcuate, piston that is slidable with close tolerances in the cylinder, as distinguishes from the conventional cylindrical type of piston, in order to gain the advantages of universal movement of the spherical, or axially arcuate piston within the cylinder so as to avoid the necessity of extensive linkages and yielding connections between the piston and the object whose movements it is desired to be damped.

We are fully aware of the existence of the United States Letters Patent to Young, 1,254,106, for Shock Absorber, January 22, 1918. This patent discloses a shock absorbing cylinder and a spherical, or axially arcuate piston slidable therein, the cylinder being connected to a vehicle body and the piston rod being connected by a yielding connection to the vehicle axle. Near the upper portion of the cylinder there is provided a vent aperture into atmosphere. To the upper closed head of the cylinder is secured a compression coil spring that urges a valve downwardly in the cylinder normally to a position below the vent. Thus, a movement of the piston upwardly, in response to a shock to the axle in an upward direction, results in a compression of air in the cylinder between the piston and the valve. When this compression reaches a predetermined degree, the valve is lifted to open the vent to atmosphere, permitting free motion of the piston during the remainder of its upward stroke. Upon rebound, the piston will be drawn downwardly, permitting the spring to force the valve down in the cylinder past the level of the vent. This is, in a true sense, a shock absorber, but not a device that is capable of performing as a device for at all times uniformly damping all of the movements of the piston within the cylinder in all directions in response to such movements of the device whose movements it is desired to be damped.

It is therefore one of the primary objects of this invention to provide a damping mechanism that includes a cylinder carried by a frame member and an axially arcuate, or substantially spherical, piston slidable with close tolerances in the cylinder and a piston rod rigidly secured to the piston and the object to be damped by non-yielding connections to obtain the advantages of the universal movement of the spherical, or axially arcuate, piston within the cylinder and the elimination of yielding connections and linkages between the cylinder and the object whose movements it is desired to be damped.

Another, and extremely important object of the invention is to provide in such a damping mechanism, means whereby all movements of the object to be damped in any direction are at all times damped.

More specifically, we propose to employ a substantially spherical, or axially arcuate, ball slidably mounted, with close tolerances, in a cylinder. The cylinder will be referred to as having a permanently closed head. By this we mean to imply that we employ no cylinder vents, valves or springs. The fluid between the piston and the cylinder head may be gaseous or liquid. Thus, regardless of the position of the piston in the cylinder, whether at rest or during any upward or downward stroke of the piston in the cylinder, at any time, it is necessary at all times that a positive force in an upward or downward direction be applied to the piston, through its piston rod from the object to be damped, and against a uniform resistance, in order to cause any upward or downward movement of the piston relative to the cylinder. It is this characteristic that renders our damping mechanism a true damper, in addition to being a shock absorber. By referring to our piston as being axially arcuate, or substantially spherical in form, we mean to imply that that portion of the periphery of the piston that comes in contact with the inner surface of the cylinder is arcuate, or substantially spherical. It is not necessary that the remainder of the piston be truly spherical, or arcuate, in form. Moreover, hereinafter, when the terms substantially spherical and axially arcuate are used to describe the periphery of the piston, they are intended to be interchangeable in meaning, and not intended to be restricted necessarily to a true geometrical sphere, but to include an axially arcuate periphery with respect to its axial plane of stroke in the cylinder and to distinguish over a cylindrical piston for the hereinabove advantageous purposes.

More specifically, the invention relates to improvements in damping controls for instruments having an element which is movable in a limited orbital path.

Accordingly, an object of the invention is to provide an improved damping mechanism that will be suitable for use as a damping control for flight instruments.

A more specific object of this invention is to provide an improved damping control for an aircraft flight instrument of the gyro type, wherein effective damping is maintained on the gimbal ring in which the gyro is mounted.

Another object of this invention is to provide an improved damping control for an aircraft flight instrument of the gyro stabilized type, wherein effective damping is maintained on the gyro mounting gimbal which is movable in a limited orbital path to prevent undesirable oscillations of the indicating needle of such an instrument.

A further object of this invention is to provide an improved damping control structure associated with a body movable in a limited orbital path to prevent undesirable oscillations of the body.

Still another object of this invention is to provide an improved damping control structure of the piston type connected with a body movable in a limited orbital path to prevent undesirable oscillations of the body.

With the foregoing and other objects in view, the invention resides in the combination of parts and in the details of construction hereinafter set forth in the following specification and appended claims, certain embodiments of which are illustrated in the accompanying drawings in which:

Figure 1:
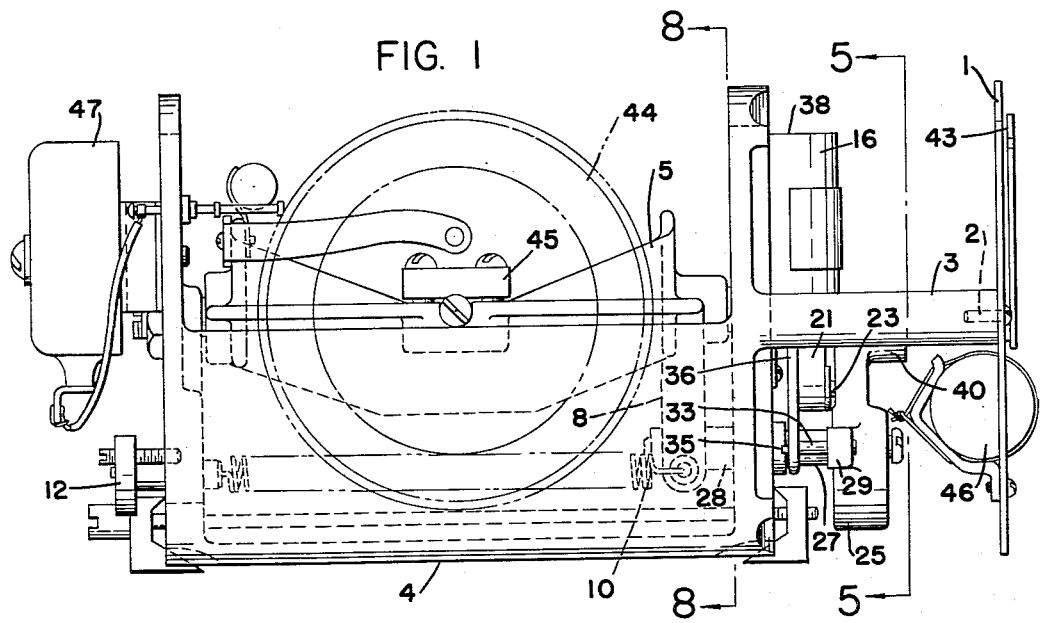
Figure 1 is a view in side elevation of an instrument to which the invention is applied with the outer casing removed.
Figure 2:
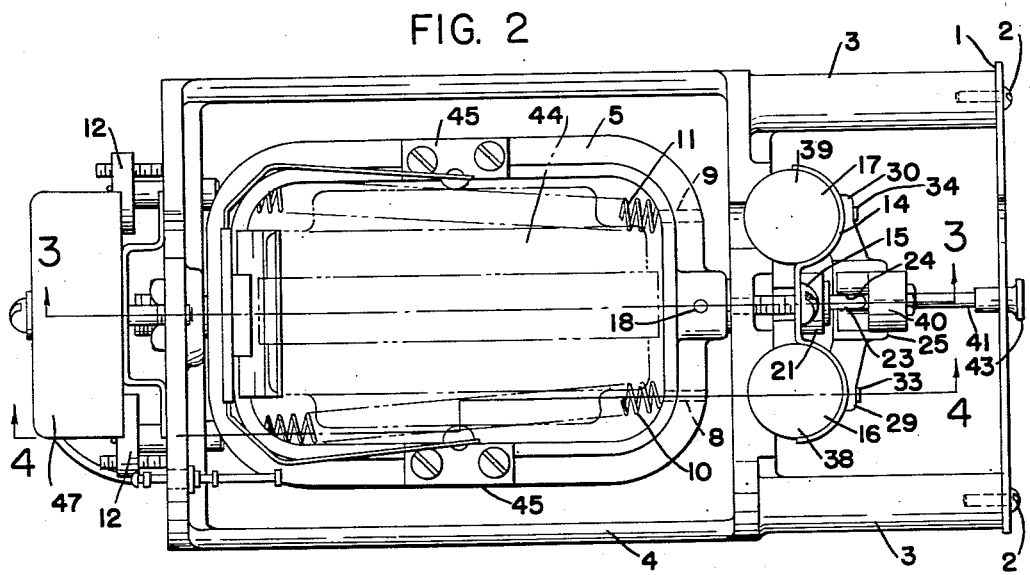
Figure 2 is a plan view of the instrument illustrated in Figure 1.
Figure 7:
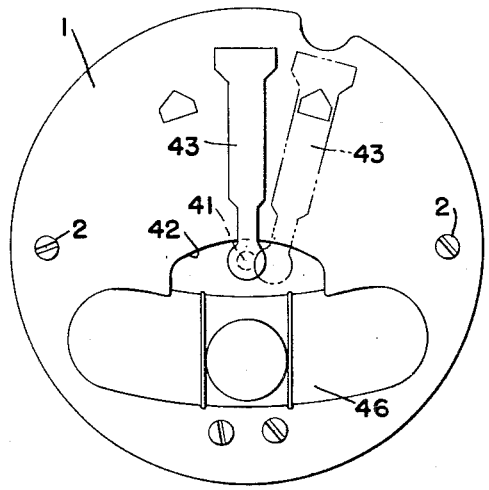
Figure 8:
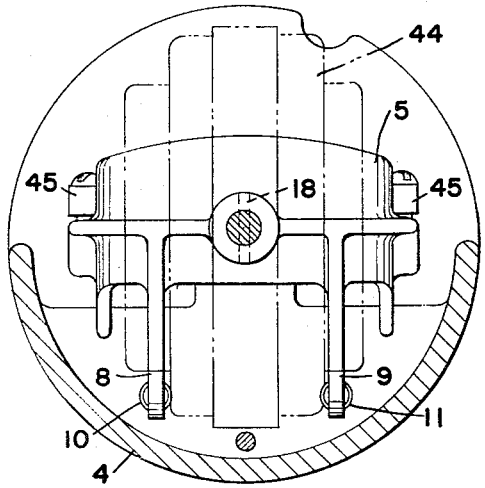

Figure 7 is a view in front elevation of the instrument of Figure 1, illustrating the indicating structure of the instrument; and Figure 8 is a partially sectional view in front elevation taken along the lines 8—8 of Figure 1.

This invention is particularly suitable for aircraft instruments of the slip and turn type, but is equally adaptable to use in damping out oscillations in any body, especially a body that is mounted to move in a limited orbital path. However, for purposes of description of the invention and its operation, this specification will describe its adaptability to slip and turn indicators as stabilized by gyros.

Referring now more particularly to the drawings, a slip and turn indicator is illustrated with its casing removed as having an instrument dial 1, connected by screws 2, to forwardly projecting studs 3, of supporting frame 4.

Figure 4:
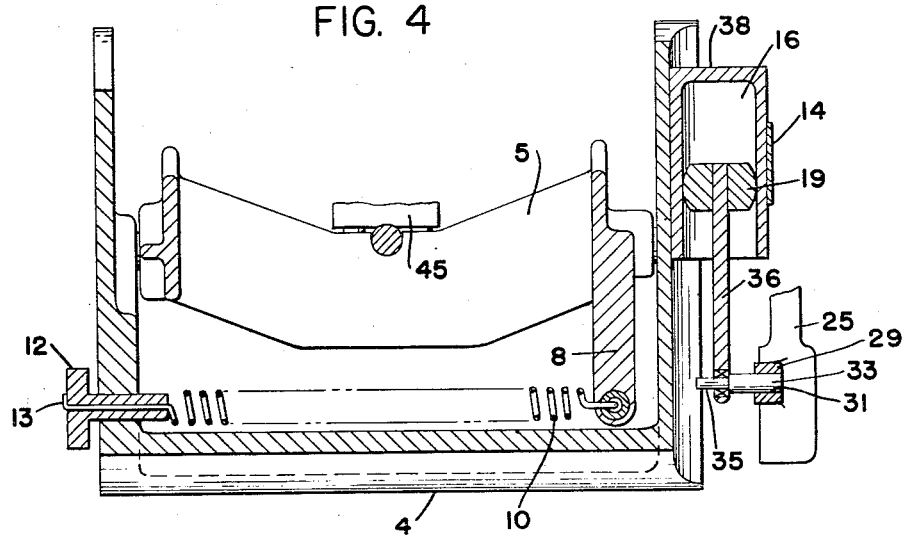
Figure 4 is a sectional view in side elevation taken along the lines 4—4 of Figure 2.
Figure 5:
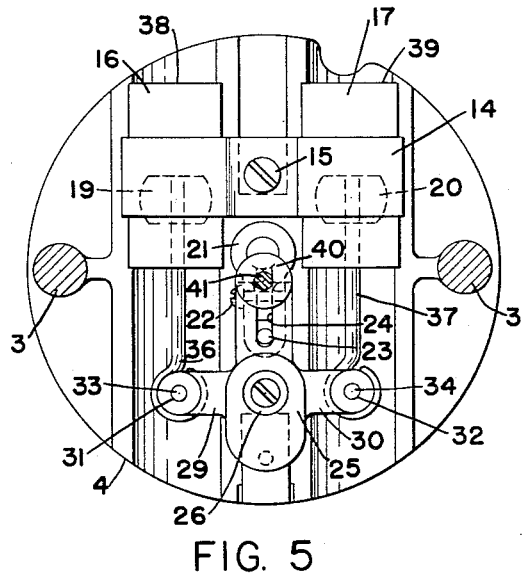
Figure 5 is a partially sectioned view in front elevation taken along the lines 5—5 of Figure 1.
Figure 6:
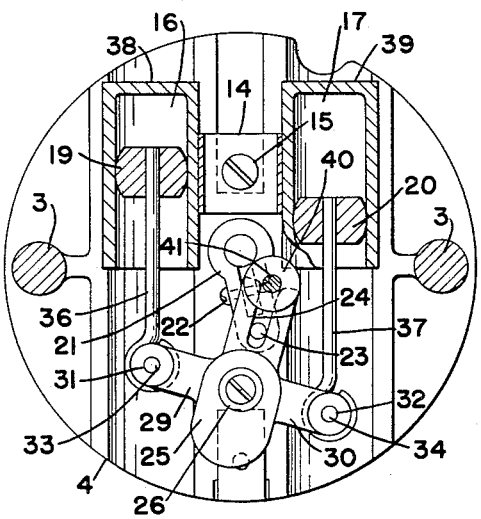
Figure 6 is a view in partial section similar to Figure 5 but illustrating the damping control pistons in action, with the cylinders therefor, cut away for clarity.

Mounted within frame 4, which is fixed relative to the case, not shown, is a gimbal ring 5. Gimbal ring 5 is supported within frame 4 by bearings 6 and 7 along the longitudinal axis of the instrument. Positioned on either side of bearing 7 and depending from gimbal ring 5 is a pair of arms 8 and 9. To the end of each arm are connected coil restraining springs 10 and 11. The other ends of springs 10 and 11 are connected to the rear end of frame 4 by being secured in plugs 12 that are press fit into frame 4. In Figure 4 the end 13 of spring 10 is illustrated as projecting through a plug 12, and being bent over at the exterior of the plug. The springs limit the orbital movement or oscillation limits of the gimbal ring about its bearing axis.

Figure 3:
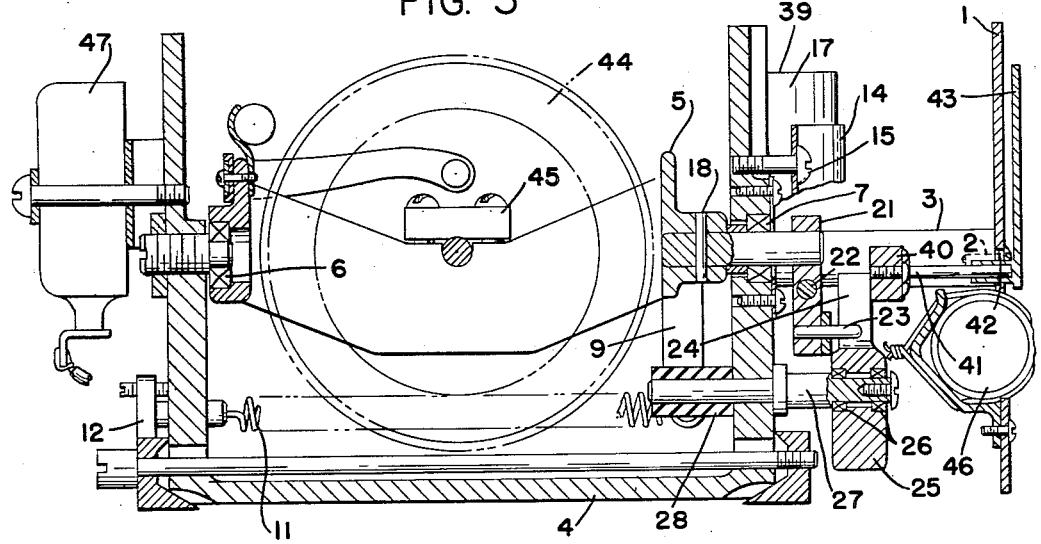
Figure 3 is a sectional view in side elevation taken along the line 3—3 of Figure 2.

Connected to frame 4 by means of clamp 14 and screw 15, are damping control cylinders 16 and 17. The bearing 7, which is connected for movement with gimbal 5 by a press fit pin 18, projects beyond casing 4 to provide a drive structure for the operating damping pistons 19 and 20 slidably mounted in cylinders 16 and 17. Clamped to bearing 7 is a split crank member 21, which is secured to the bearing by tightening a clamping screw 22. Extending forwardly of member 21 and secured therein by a pressed fit or other suitable means is a pin 23. Pin 23 engages a U-shaped slot 24 in rocker arm member 25. As illustrated in Figure 3, member 25 is supported for free rotation by antifriction bearings 26 on a stud 27 which itself is supported by frame 4. Within the frame 4 the stud 27 acts as a stop and is provided with a resilient sleeve 28 to absorb the shock of arms 8 and 9 contacting the same when springs 10 and 11 fail to constrain the gimbal, and a positive limit stop is desired in either direction of movement. The rocker arm member 25 is provided with arms 29 and 30 extending to either side of its bearing support. Near the extremity of each arm 29 and 30 there are provided holes 31 and 32 respectively to accommodate, in pressed fit relationship, wrist pins 33 and 34. About the reduced portion 35, of each pin 33 and 34 are mounted the ends of piston rods 36 and 37, the former being rigidly connected in any suitable manner to piston 19 and the latter rigidly connected to piston 20.

The bores of cylinders 16 and 17 are precision machined. The peripheral walls of pistons 19 and 20 are likewise precision machined to have a snug, free, sliding fit with the cylinder bores. Since the cylinders between the pistons and the heads 38 and 39 of the cylinders 16 and 17 are not provided with outlets for air, a considerable dash-pot or damping, action is obtained by the arrangement, as distinguished from merely a shock absorbing action. In order to secure a universal freedom between the pistons and the cylinder bores, the peripheral surfaces of the pistons are essentially of spherical, or arcuate, form. The pistons may be spherical, but are shown flattened at the top and bottom with the mid-portions spherical.

Secured to the upper front surface of member 25 is a mounting block 40 having a forwardly extending pin 41 threaded therein. The pin 41 extends through a slot 42 in dial 1 and fixedly carries a pointer 43 thereon. Thus any movement of member 25 is transmitted to pointer 43.

In operation, as the aircraft carrying the instrument of this invention turns, the gyro 44 mounted in bearings 45 on gimbal ring 5 will precess relative to the speed or rate of the turn and indicate this to the pilot by action of the pointer 43 as controlled by the movement of the rocker arm member 25 which is responsive to gimbal ring movement. Movement of the pointer 43 is damped by the piston and cylinder arrangement of the invention in either direction of orbital movement by the gimbal 5. The pistons 19 and 20 of this invention allow the gyro to return to a vertical position fast enough to be within the time tolerance required for most aeronautical purposes but allow no over travel or oscillation of pointer 43. Since no bleed valves are provided in the cylinders between the pistons and the cylinder heads, the only escape of air must be from one side of the piston to the other when any orbital movement occurs. Thus, a predetermined damping effect may be achieved by adhering to close machining tolerances of the piston axially arcuate surfaces and the cylinder bores.

In Figure 1 the standard type of slip indicator 46 is shown carried by the bottom portion of dial 1. On the rear of frame 4 is mounted a radio interference eliminator 47 since the gyro is electrically driven. Neither the eliminator 47, nor the indicator 46, together with the electrical drive means for the gyro, form any part of this invention and hence they have not been described in detail.

Thus, it will be seen that the invention provides a novel, simple and improved damping control for a slip and turn indicator or other instrument having an element with a limited orbital movement. Moreover, various modifications of this invention, particularly in the damping drive linkage may be made within the purview of the invention.

Moreover, we have provided a damping device that employs a substantially spherical, or arcuate, piston that is slidable with close tolerances in the cylinder, as distinguished from the conventional cylindrical type of piston, in order to gain the advantages of universal movement of the spherical piston within the cylinder in order to avoid the necessity of extensive linkages and yielding connections between the piston and the object whose movements it is desired to be damped.

We have also provided a damping mechanism that includes a cylinder carried by a frame member and an arcuate or substantially spherical piston slidable with close tolerances in the cylinder and a piston rod rigidly secured to the piston and the object to be damped by non-yielding connections to obtain the advantages of the universal movement of the spherical, or arcuate, piston within the cylinder and the elimination of yielding connections and linkages between the cylinder and the object to be damped in its movements.

We have also provided in such a damping mechanism, means whereby all movements of the object to be damped in any direction are at all times damped.

More specifically, we have provided a substantially spherical, or arcuate, ball slidably mounted, with close tolerances, in a cylinder. The cylinder has been referred to as having a permanently closed head. By this we mean to imply that we employ no cylinder vents, valves or springs. The fluid between the piston and the cylinder head may be gaseous or liquid. Thus, regardless of the position of the piston in the cylinder, whether at rest or during any upward or downward stroke of the piston in the cylinder, at any time, it is necessary at all times that a positive force in an upward or downward direction be applied to the piston through its piston rod from the object to be damped, and against a uniform resistance, in order to cause any upward or downward movement of the piston relative to the cylinder. It is this characteristic that renders our damping mechanism a true damper, in addition to being a shock absorber. By referring to our piston as being arcuate, or substantially spherical in form, we mean to imply that that portion of the periphery of the piston that comes in contact with the inner surface of the cylinder is arcuate, or substantially spherical. It is not necessary that the remainder of the piston be truly spherical, or arcuate, in form. Moreover, hereinafter, when the terms substantially spherical and arcuate are used to describe the periphery of the piston, they are intended to be interchangeable in meaning, as not intended to be restricted necessarily to a true geometrical sphere, but to be arcuate and to distinguish over a cylindrical piston for the hereinabove advantageous purposes.

We claim:

1. A damping mechanism for damping the movements of a member mounted in a frame for limited orbital movement relative thereto, said damping mechanism comprising a cylinder having a permanently closed head and carried by said frame, drive means including an arm carried by said member and a lever connected to said arm to be oscillated thereby, a pin secured to said frame and upon which said lever is mounted, said pin constituting a stop to limit orbital movement of said member in both directions, a piston slidably mounted in said cylinder and a piston rod rigidly secured to said piston against relative movement, said piston being spherical in form in so far as that portion of the peripheral surface of said piston which engages the inner surface of said cylinder is concerned to afford universal movement of said piston in said cylinder, said piston rod being directly connected to said lever to be actuated thereby to damp the movements of said member.

2. A damping mechanism for an aircraft flight instrument including a frame, a gimbal ring carried by bearings on said frame and a gyro rotatably mounted within said gimbal ring to be supported thereby, said damping mechanism comprising a pair of opposed damping units, each damping unit including a cylinder having a permanently closed head and carried by said frame, a piston slidably mounted in said cylinder and a piston rod rigidly secured to said piston against relative movement, said piston being spherical in form in so far as that portion of the peripheral surface of said piston which engages the inner surface of said cylinder is concerned to afford universal movement of said piston in said cylinder, drive means including an arm directly connected to said gimbal ring and a lever connected to said arm to be oscillated thereby, a pin secured to said frame and upon which said lever is mounted, said pin constituting a stop to limit oscillatory movement of said gimbal ring in both directions, said piston rods being directly connected to said lever to be actuated thereby to damp the movements of the axis of said gyro.

3. A damping mechanism for an aircraft instrument including a dial, a pointer, a frame, a gimbal ring carried by bearings on said frame and a gyro rotatably mounted within said frame to be supported thereby, said damping mechanism including a pair of opposed damping units, each of said damping units including a cylinder having a permanently closed head and carried by said frame, a piston slidably mounted in said cylinder and a piston rod secured to said piston, drive means including an arm directly connected to said gimbal ring and a lever connected to said arm to be oscillated thereby, a pin secured to said frame and upon which said lever is mounted, said pin constituting a stop to limit oscillatory movement of said gimbal ring in both directions, said lever being connected to said pointer to support and drive the same, said piston rods being directly connected to said lever to effect a damping control back through said lever and arm to said gyro and to said pointer to minimize oscillations thereof.

References Cited in the file of this patent

UNITED STATES PATENTS

| | | |
|---|---|---|
| 1,330,501 | Tanner | Feb. 10, 1920 |
| 2,242,253 | Lyman | May 20, 1941 |
| 2,444,625 | Bevins | July 6, 1948 |
| 2,709,921 | Sylvan | June 7, 1955 |

FOREIGN PATENTS

| | | |
|---|---|---|
| 340,327 | Great Britain | Jan. 1, 1931 |
| 387,366 | Great Britain | Jan. 30, 1933 |